United States Patent [19]

Allard et al.

[11] Patent Number: 5,729,689
[45] Date of Patent: Mar. 17, 1998

[54] NETWORK NAMING SERVICES PROXY AGENT

[75] Inventors: James E. Allard, Seattle; James Stewart, Woodinville; Pradeep Bahl; David M. Thompson, both of Redmond, all of Wash.

[73] Assignee: Microsoft Corporation, Redmond, Wash.

[21] Appl. No.: 428,582

[22] Filed: Apr. 25, 1995

[51] Int. Cl.⁶ .................................................. H04L 12/00
[52] U.S. Cl. ....................... 395/200.58; 395/610
[58] Field of Search ........................... 395/200.02, 200.1, 395/200.12, 200.15, 200.16, 200.2, 610

[56] References Cited

U.S. PATENT DOCUMENTS

| 5,224,205 | 6/1993 | Dinkin | 395/200.02 |
| 5,434,974 | 7/1995 | Loucks | 395/700 |
| 5,442,630 | 8/1995 | Gagliardi | 370/85.13 |

OTHER PUBLICATIONS

Computer Networks, Tanenbaum A, 1981, ISBN 0–13–165183–8 §§1.5.2 (pp. 23–26), 5.4.2 (pp. 231–235), 8.1.2 (pp. 335–338), 8.2 (pp. 353–354), 8.2.1 (pp. 354–358).

Primary Examiner—Tod R. Swann
Assistant Examiner—Christopher Chow
Attorney, Agent, or Firm—Leydig, Voit & Mayer, Ltd.

[57] ABSTRACT

A method and apparatus are described for enabling a first node, which utilizes a first naming protocol, to obtain an network address of another node from a naming service that does not provide addresses in accordance with the first naming protocol. A network embodying the present invention includes a naming proxy agent. A first node in the network obtains network addresses corresponding to node names according to a first naming protocol, and a second node conducts network naming operations according to a second naming protocol that is incompatible with the first naming protocol. As a result, the first node cannot by itself obtain the address of the second node by means of a node name query under the first naming protocol.

However, the naming proxy agent receives a first naming query transmitted by the first node according to the first naming protocol that includes the name of the second node. The naming proxy agent converts the first naming query into a second naming query that also includes the registered name. The naming proxy agent transmits the second naming query according to the second naming protocol.

13 Claims, 11 Drawing Sheets

| PROXY (14) NAME CACHE                              ||||||
| LOCAL SUB-NET ADDRESS = 1.1.1.X LAN_A)             ||||||
| NAME | RESPONSE TYPE | NETWORK ADDRESS | NODE TYPE | TIME LEFT (Minutes) |
|---|---|---|---|---|
| BOB_PC | NEG. | UNKNOWN | - - | 8 |
| SUE_PC | NEG. | UNKNOWN | - - | 7 |
| JANE_PC | NEG. | UNKNOWN | - - | 2 |
| JOHN_PC | NEG. | UNKNOWN | - - | 8 |
| PRINTER_2 | POS. | 2.2.2.1 | H | 5 |
| SALES_1 | POS. | 2.2.2.3 | B | 9 |
| PROXY_1 | POS. | 1.1.1.7 | M | 3 |
| FILESERVER_1 | POS. | 1.1.1.5 | M | 1 |
| PRINTER_1 | POS. | 1.1.1.6 | P | 4 |

PROXY NAME CACHE (FOR PROXY 14)

FIG. 3

| NETWORK NAME DIRECTORY ||||
| NETWORK NAME | NETWORK ADDRESS | NODE TYPE | TIME TO LIVE (DAYS) |
|---|---|---|---|
| FILESERVER_1 | 1.1.1.7 | M | 1 |
| PRINTER_1 | 1.1.1.6 | P | 2 |
| PROXY_1 | 1.1.1.5 | M | 5 |
| PRINTER_2 | 2.2.2.1 | H | 2 |
| SALES_1 | 2.2.2.3 | B | [STATIC] |
| SALES_2 | 2.2.2.4 | P | 4 |
| PROXY_2 | 2.2.2.2 | M | 8 |

NAME SERVER (32) DIRECTORY

FIG. 4

NETWORK NAMING SERVICES PROXY AGENT

AREA OF THE INVENTION

The present invention generally relates to the area of computer networks and more specifically to methods and apparatuses for locating and establishing a connection between a first node and a second node in a network wherein the network name query protocol practiced by the first node prevents the first node from obtaining the network address for the second node with which it connects.

BACKGROUND OF THE INVENTION

As a general rule, as computer networks grow in size and complexity, the diversity of systems (nodes) included in the computer networks increases. In order to facilitate establishing connections and exchanging information between nodes in such networks, network designers have adopted standard protocols which are utilized by the nodes in order to communicate in the networks. Examples where adopting uniform standards has met with considerable success include the well known TCP/IP data transport protocol and the NFS (Network File System, Trademark SUN Microsystems) file sharing protocol.

One aspect of establishing connections between nodes is determining an address of a particular named resource. The addresses of nodes on a network are typically represented in strings of several characters. An example of such an address is 128,192,141.72. These strings are often longer than phone numbers and not easily remembered by a user—especially if the user does not seek access to the computer resource on a regular basis. Moreover, the network addresses of particular named nodes on a network change as the named nodes disconnect and re-connect under a new address on the network. A solution to the proper addressing of end nodes in a network is provided by naming service technologies. The naming service technologies abstract the specific network addressing scheme for users.

Naming service technologies provide rapid look-up procedures for finding network addresses corresponding to named nodes. In networks having naming services, rather than specifying an actual network address for a node (which may no longer be valid), a network client transmits (or broadcasts) an address query for a node to which the network client wishes to establish a connection. The address query, which identifies the node by name, is received by another node on the network that is capable of providing a network address corresponding to the named node. The node providing such an address may be, for example, the named node or a node that includes a directory of registered nodes on the network (referred to as a "name server"). After retrieving the address corresponding to the named node, the responding node transmits the network address to the network client.

The substantial success achieved in obtaining universal acceptance of standards for the network protocols identified above (TCP/IP and NFS) has not carried over to naming services technologies. Instead, a large number of incompatible node name resolution protocols have been implemented. As a result, in some instances a first node in a network is prevented from obtaining a network address corresponding to a second node attached to the network because the naming protocols used by the first and second nodes are incompatible. This is particularly frustrating for a user when the end systems (nodes) are running compatible network transports enabling the nodes to connect based upon an address, but are prevented from doing so because the user only knows the name of the node with which a connection is desired.

The broadcast node (b-node) naming protocol is a well known network naming protocol for TCP/IP networks. Nodes on a network which use the b-node naming protocol register a name by broadcasting the name on their local area network. After failing to receive a negative name registration response after one or more registration broadcasts, b-node registration is complete. A b-node obtains an address corresponding to a node name by broadcasting on the b-node's local area network a "where is" query that includes a name for a node with for which a network address is desired. The b-node then waits for a query response containing a network address corresponding to the name. If a response is received, then the network address is used to establish a connection between the b-node and the named node. The b-node name resolution protocol is particularly well suited to simple, single bus, local area networks (LANs). The b-node protocol is not intended for use on networks containing a plurality of sub-nets connected via wide area network (WAN) links since broadcasting a name for resolution throughout an entire WAN is considered too costly in terms of both time (delays) and resources utilized.

The point-to-point node (p-node) protocol is another well known naming protocol. P-nodes register their name in a network entity referred to as a "name server". The name server compiles a list of node names (without duplication of a name) and addresses corresponding to the names. In order to obtain an address corresponding to a node name using the p-node naming protocol, a requesting p-node transmits a query containing the node name to the name server. The name server, which maintains a directory of network node names and corresponding network addresses, transmits a response message to the requesting node. The response message contains the network address for the named network node. The p-node name resolution protocol is particularly useful in complex networks comprising a large number of sub-networks connected to form a large network. Most organization networks exceeding 200 nodes are such networks. A more complete background description of the b-node and p-node naming protocols is provided in Network Working Group, Request For Comments (RFC): 1001 "Protocol Standard For a NetBIOS Service on a TCP/UDP Transport: Concepts and Methods" (March 1987), and Request For Comments (RFC): 1002 "Protocol Standard For a NetBIOS Service on a TCP/UDP Transport: Detailed Specification" (March 1987).

Generally speaking, the b-node protocol and p-node protocol are distinct, incompatible naming protocols. For example, in a sub-network comprising a plurality of DOS clients connected to a complex corporate network, the DOS clients that utilize the b-node naming protocol cannot obtain network addresses for p-nodes on the network, nor can the b-nodes obtain network addresses for non-local nodes on the network since b-nodes only broadcast name queries locally.

One solution to the problem of resolving names of non-local nodes for the b-nodes is to upgrade all of the DOS clients (b-nodes) so that the DOS clients utilize p-node name resolution and are therefore capable of obtaining the network addresses of non-local nodes. This solution may lead to over-population of the directory in the name server since DOS clients operating as p-nodes will needlessly populate the directory. Typically, other non-local nodes will not want to obtain the network address of the DOS clients and therefore this solution is wasteful and actually harmful since the search for other nodes on the network will be slowed. In the instance that a b-node's address should be attainable by means of the p-node naming protocol, the b-node is entered statically (by a network administrator) in the name server's directory.

However, up-grading all the nodes to operate under a different naming protocol is a time consuming and costly project. Moreover, all the nodes must be updated each time a new name resolution protocol is added to the network. Finally, in many cases, the software or technology to perform the necessary modifications to the existing systems is simply not available.

SUMMARY OF THE INVENTION

It is a general object of the present invention to provide naming inter-operability for incompatible name resolution protocols in a network.

It is another, more specific object of the present invention to provide the aforementioned naming inter-operability with minimal intervention with both client systems (end nodes) and name servers in an existing network.

It is another, related, object to centralize modifications to upgrade systems to facilitate the aforementioned naming inter-operability.

Yet another related object of the present invention is to minimize the task faced by managers of sub-nets to upgrade the sub-nets to include the aforementioned naming inter-operability.

It is yet another object of the present invention to enable the distribution of datagrams beyond the boundaries imposed by a single naming service.

It is a more particular object of the present invention to enable the distribution of broadcast mode datagrams beyond the physical boundaries of a LAN.

The above described and other objects are met by a network including a naming proxy agent. The naming proxy agent operates as a translator between network nodes practicing incompatible network naming protocols which would otherwise bar the establishment of a connection between the network nodes.

The invention is incorporated into a network including a plurality of nodes that obtain the addresses of other nodes in the network by transmitting names according to naming protocols and receiving addresses corresponding to the names. The network includes a first node that obtains network addresses corresponding to node names according to a first naming protocol. The network also includes a second node which is associated with a registered node name. The second node conducts network naming operations according to a second naming protocol that is incompatible with the first naming protocol. As a result, the first node cannot obtain an address corresponding the second node by means of a node name query under the first naming protocol.

However, in accordance with the present invention, the network includes a naming proxy agent. The naming proxy agent receives a first naming query transmitted by the first node according to the first naming protocol that includes the node name of the second node. The naming proxy agent converts the first naming query into a second naming query that also includes the node name. The naming proxy agent transmits the second naming query according to the second naming protocol. Thus, the naming proxy agent enables name queries from the first node to be responded to by a network entity operating under the second naming protocol even when the network entity is not capable of furnishing responses to direct queries from the first node in view of the incompatibility of the first and second naming protocols.

In accordance with an embodiment of the present invention, the naming proxy agent extends a feature of the second naming protocol—in particular datagram distribution to a related group of nodes—to nodes operating under the first naming protocol. The proxy obtains a list of node addresses associated with a group name. This group name was received by the proxy in a datagram under the first naming protocol. The proxy then forwards a datagram to each of the nodes corresponding to the list of node addresses.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 is a schematic depiction of the data structures maintained by the naming proxy agent in order to facilitate obtaining a network address in accordance with the illustrative embodiment of the present invention;

FIG. 4 is a schematic depiction of an illustrative portion of a name server directory containing a set of p-node names and the corresponding network addresses;

DETAILED DESCRIPTION OF THE DRAWINGS

Figure 1:
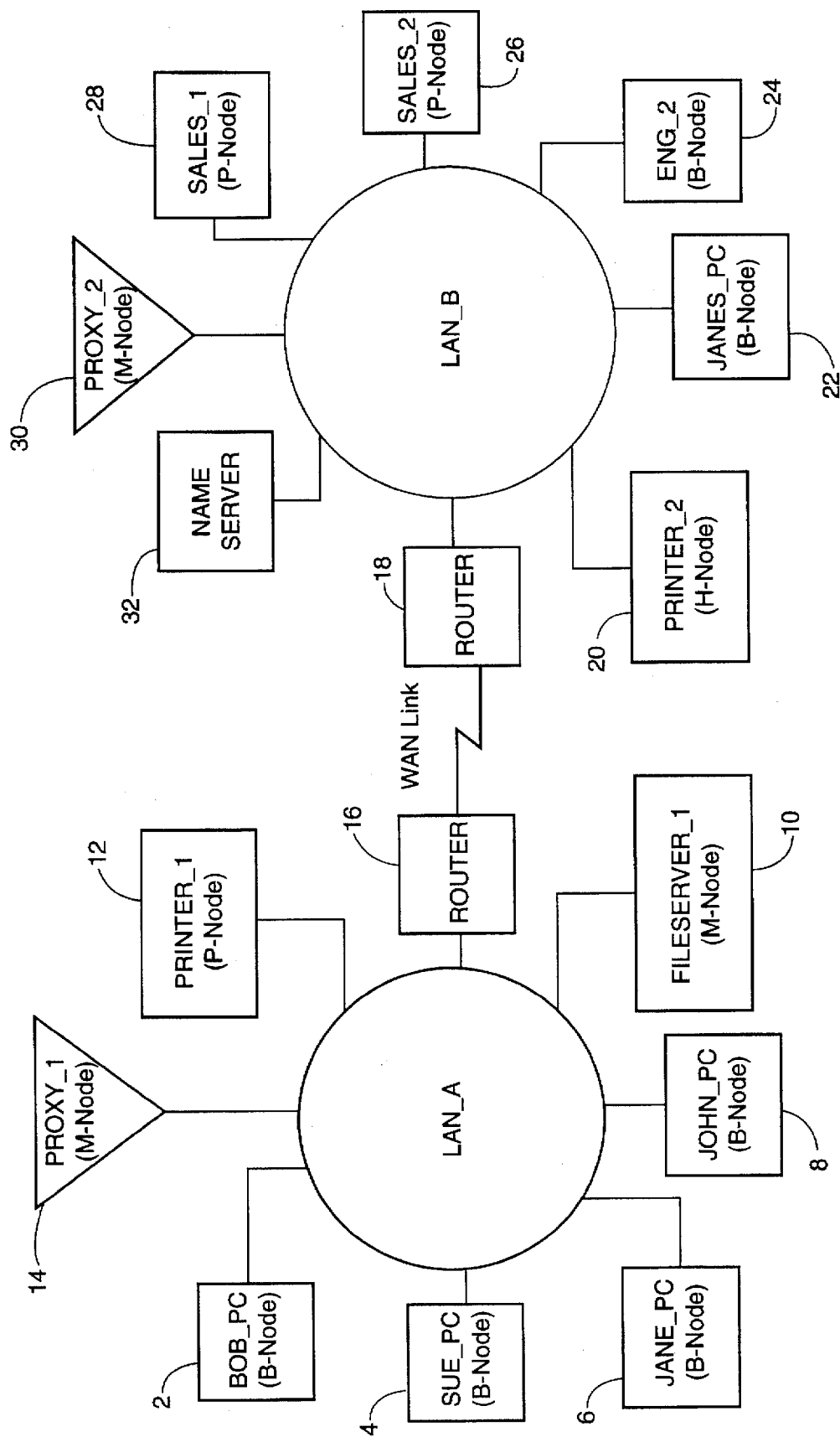
FIG. 1 is a schematic depiction of an illustrative computer network embodying the present invention that contains heterogenous naming service technologies.

Turning now to FIG. 1, a network incorporating the present invention is schematically depicted. The network includes LAN_A comprising b-nodes 2, 4, 6 and 8. The b-nodes are computer workstations utilizing the MS-DOS (Registered Trademark of Microsoft Corporation) operating system. As discussed generally in the background section, b-nodes broadcast their registration and query requests on their local area network.

In the illustrative example of the present invention, a response to a b-node query or registration broadcast must be received by the requesting b-node before a time out period elapses (e.g., 750 msec.). During registration, if a requesting b-node broadcast does not receive a negative name registration response after a first registration broadcast, then the requesting b-node will broadcast the registration request a second time. If a negative name registration response is not received again, then the requesting b-node will broadcast the registration request a third time. If no response is received within the time out period after the third registration request is broadcast, then the requesting b-node broadcasts a name claim and records a successful registration. If, however, a negative name registration response is received before the third time out period elapses, then the requesting node records a failure to register.

B-nodes also broadcast b-node queries up to three (3) times in the event that a response is not received before a time period elapses after broadcasting a b-node query. If a response is received, then the address is used to establish communication. However, if no query response is received within the time out period after the third b-node query, then the requesting b-node records a failure to obtain an address.

LAN_A also includes a p-node 12. In the illustrative example of the invention, the p-node 12 and all p-nodes in the network utilize NBNS to register, query, and release node names. P-node queries are transmitted to a Name Server 32. In a manner analogous to b-nodes, a p-node will transmit a same registration, query, or release message a number of times (e.g., three times) after appropriate waiting periods have elapsed (e.g., 750 msec.) before recording a success or failure.

LAN_A also includes an m-node 10. In the illustrative embodiment of the invention, the m-nodes (mixed nodes) register, query, and release names according to the m-node specification provided in Network Working Group, Request For Comments (RFC): 1001 (March 1987), and Request For Comments (RFC): 1002 (March 1987). It is noted that the b-node and p-node operations referred to below in describing the registration, query and release operations executed by an m-node are the same as those operations described above with respect to the operation of b-nodes and p-nodes, and therefore the manner in which success or failure of a particular b-node or p-node naming operation is achieved will not be repeated.

During name registration, an m-node registers a name according to both the b-node and p-node naming protocols. More particularly, if the m-node successfully registers its name locally under the b-node naming protocol, then the m-node attempts to register its name with a name server under the p-node naming protocol. If the m-node fails to obtain registration under either the b-node or p-node naming protocol, then the registration fails. Furthermore, if the p-node protocol registration fails (after a successful b-node protocol registration), then m-node executes a b-node release. After registering a name, an m-node issues a negative name registration response when another local node attempts a b-node registration using the name of the registered m-node.

When an m-node submits a query, the m-node first broadcasts a b-node (broadcast) query. If the m-node fails to obtain an address response to the b-node query, then the m-node transmits a p-node query to the Name Server 32. After registering locally, the m-node responds to b-node queries on its local area network that include the name of the m-node. Finally, a registered m-node releases its name from both the Name Server 32 and the local area network on which it resides.

In accordance with an illustrative embodiment of the present invention, LAN_A includes a network naming proxy agent 14 (referred to as "proxy 14"). Without the proxy 14, a node on LAN_A could not use a b-node query to obtain an address from (1) a non-local (not on LAN_A) node or (2) a local node that does not incorporate the b-node naming protocol response mechanism into its network operating system. However, the proxy 14 receives a b-node query that includes a node name from a requesting node. The proxy converts the b-node query into a p-node query having the same name and transmits the p-node query to the Name Server 32.

If the node name included in the p-node query is listed in the directory of the Name Server 32, then the Name Server 32 transmits a p-node response including an address corresponding to the node name to the proxy 14. The proxy 14 then converts the p-node response from the Name Server 32 into a b-node query response that includes the address, and transmits the b-node query response to the requesting node. The requesting node may then use the address included in the b-node query response to establish a connection based upon the address included in the b-node query response. Thus, the proxy 14 residing on LAN_A enables a node on LAN_A to obtain, through a b-node query, an address for a non-local node or a local node that does not incorporate the b-node protocol. The specific operation of the proxy 14 is described in greater detail below in conjunction with the steps summarized in FIGS. 5, 6, 7, 8 and 9 described below.

LAN_A is communicatively coupled to LAN_B by routers 16 and 18 which transmit messages between the nodes on LAN_A and the nodes on LAN_B. Network routers, such as routers 16 and 18, are well known to those skilled in the art. Static routers are depicted in FIG. 1. However, in alternative embodiments of the invention, the routing function may be fulfilled by, for example, client computers on LAN_A having enhanced network capabilities enabling the client computers to establish a link between LAN_A and LAN_B via a modem or other known transmitter/receiver mechanisms such as routers connecting two ethernets in a same building.

In the illustrative depiction in FIG. 1 of a network embodying the present invention, LAN_B includes an h-node 20. An h-node (hybrid nodes) preferentially submits registration requests, name queries, and releases under the p-node naming protocol. However, the h-node in some instances may not receive a response or acknowledgement from a name server (e.g. Name Server 32). In other instances the h-node, in response to a name query, may receive a negative response from the name server. In either of these cases, the h-node broadcasts the registration request, name query, or release operation using the b-node protocol.

Regardless of the manner in which an h-node registers, the h-node will always issue a negative name registration response when another local node attempts a b-node registration using the name of the registered h-node. Furthermore, even after successful b-node registration, the h-node will periodically attempt to register with the name server. Regardless of the manner in which an h-node registers, the h-node will always respond to b-node queries broadcast on its local area network that include the name of the h-node.

Finally, it is noted that the b-node and p-node operations referred to above in describing the registration, query and release operations executed by an h-node are the same as those operations described above with respect to the operation of b-nodes and p-nodes, and therefore the manner in which success or failure of a particular b-node or p-node naming operation is achieved was not repeated.

LAN_B also includes b-nodes 22, 24, and 28. Even though the Name Server 32 resides on the same LAN as the b-nodes 22, 24, 26, and 28, the Name Server 32 does not include a capability to respond to b-node queries. Therefore a proxy 30 on LAN_B responds to b-node queries on LAN_B for addresses corresponding to p-nodes (e.g., p-node 26) and non-local m-nodes (e.g., m-node 10) by providing the b-nodes with the addresses of these types of nodes in response to the b-node queries.

It will appreciated by those of ordinary skill in the art that this invention is applicable to a wide variety of network architectures and naming protocols. Furthermore, a proxy need not reside on a physically separate machine on a network. It will be appreciated by those skilled in the art that the proxy may reside on generally any machine connected to the network assuming that the machine meets known networking hardware and software requirements.

Figure 2:
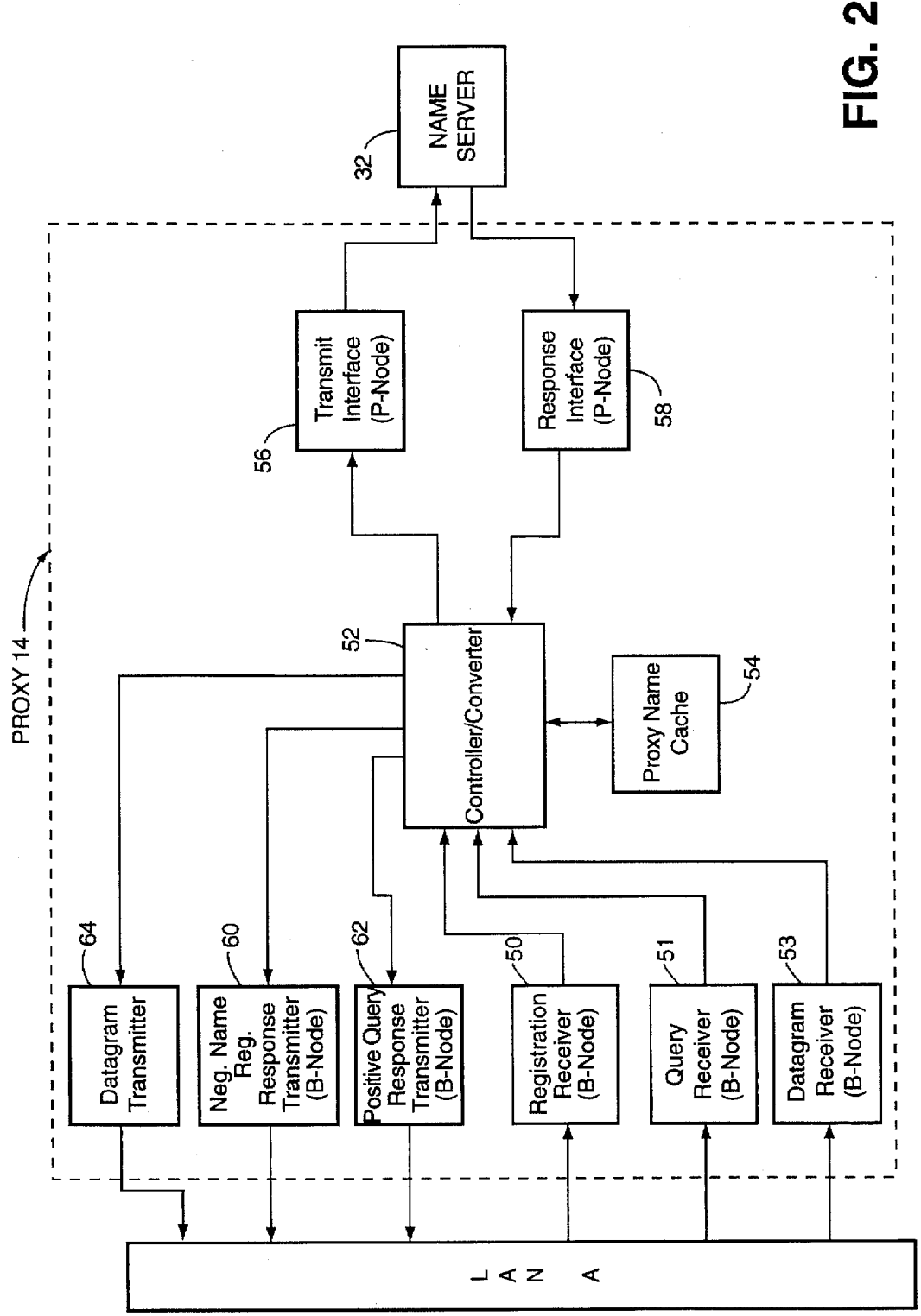
FIG. 2 is a schematic functional block diagram of the naming proxy agent in accordance with an illustrative example of the present invention.

Having described a network embodying the present invention, attention is now directed to FIG. 2 wherein a schematic functional block diagram is provided of the primary components of an illustrative example of a proxy, such as proxy 14, embodying the present invention. The schematic diagram is intended to demonstrate the functional relationship between nodes on LAN_A implementing the b-node naming protocol, the proxy 14 located on LAN_A, and the Name Server 32 operating under the p-node protocol to respond to p-node queries from the proxy 14.

The proxy 14 receives b-node registration broadcasts on LAN_A via a b-Node Registration Receiver 50. The Registration Receiver 50 passes b-node protocol registrations to a proxy cache request and response Controller/Converter 52. Based upon the state of a b-node registration flag, the Controller/Converter 52 will either determine whether the node name in the b-node registration is in a Proxy Name Cache 54 or not take any action with respect to the b-node registration. It is noted however, that even when a b-node registration is essentially ignored by the proxy function, the proxy 14 itself is registered on the LAN_A under the b-node protocol and will respond using normal b-node negative name registration response procedures to any b-node able to register the same name as the proxy 14.

The proxy 14 also receives b-node query broadcasts on LAN_A via a b-node Query Receiver 51. The Query Receiver 51 passes b-node protocol queries from nodes on LAN_A to the Controller/Converter 52. The Controller/Converter 52 determines whether the name included in a received b-node query is listed in the Proxy Name Cache 54. The Proxy Name Cache 54 contains a list of names for which the Controller/Converter 52 has received p-node responses from the Name Server 32 as well as other registration information described below in conjunction with FIG. 3.

The proxy 14 also performs b-node datagram distribution for named Internet Groups (a group of addresses specified for a single name). A b-node datagram including an Internet Group name is received by the proxy 14 via a b-node Datagram Receiver 53. If the proxy 14 identifies an Internet Group name entry in the Proxy Name Cache 54 that matches the Internet Group name in the b-node datagram, then the proxy 14 issues the datagrams to each of the addresses associated with the Internet Group name entry via a datagram transmitter 64.

If a node name cannot be found in the Proxy Name Cache 54, the Controller/Converter 52 converts the b-node protocol registration, query, and datagram broadcasts into p-node name queries. The p-node name queries are transmitted via a p-node name query Transmit Interface 56 to the Name Server 32. Responses by the Name Server 32 to the p-node name queries are received via a p-node Response Interface 58 and the information is cached in the Proxy Name Cache 54, and the proxy 14 will be prepared to respond to the next occurrence of a b-node broadcast including the name (i.e., there is no response sent at this point).

If an address is stored in the Proxy Name Cache 54, then the Controller/Converter will build a response message to be transmitted by a b-node Negative Name Registration Response Transmitter 60 or a b-node Positive Query Response Transmitter 62. The Negative Name Registration Response Transmitter 60 issues a message preventing a node on LAN_A from registering under a particular name if the name is located in the Proxy Name Cache 54 with a different network address and the b-node registration flag is set (thus enabling the proxy to enforce name uniqueness based upon the contents of the Proxy Name Cache 54). The Positive Query Response Transmitter 62 transmits a response message to a requesting node on LAN_A if the Controller/Converter determines that the Proxy Name Cache 54 contains a name listed in a received b-node protocol query, and the node corresponding to the name entry in the Proxy Name Cache 54 is either: (1) not on LAN_A or (2) incapable of responding directly to b-node protocol queries (e.g., any p-node).

Having described a network embodying the present invention and various interface components of a proxy such as proxy 14, attention is now directed to FIG. 3 wherein a set of fields are schematically depicted for the Proxy Name Cache 54 mentioned briefly above in conjunction with FIG. 2. The Proxy Name Cache 54 comprises a list of node names for which the proxy 14 has received a response (either positive or negative) from the Name Server 32. The Proxy Name Cache enables the proxy 14 to respond quickly to b-node broadcasts and reduce the number occasions in which the proxy 14 transmits a p-node name query to the Name Server 32. In particular, caching negative response from the Name Server 32 greatly reduces the overload that would result from repeated queries for other b-node names on the same sub-net, since these names will not be in the Network Name Directory of the Name Server 32.

The entries of the Proxy Name Cache 54 comprise a name field, a response type field, a network address field, a node type field, and a time left field. The name field for a node entry in the local node cache lists the node name used by other nodes in a network to obtain an address for the node. If the proxy 14 received an address from the Name Server 32 in response to a p-node protocol query, the address corresponding to the name is stored in the network address field (column 3 of FIG. 3).

If the Name Server 32 does not locate a node name associated with a p-node query from the proxy 14 in a Network Name Directory (described below in conjunction with FIG. 4) of the Name Server 32, then the Name Server transmits a "negative" response. The negative response informs the proxy 14 that the Name Server 32 was unable to furnish an address corresponding to the node name. The proxy 14 stores negative responses in the cache as well even though they do not have valid addresses or node type. The second column of in FIG. 3 depicts the response type fields for the entries of the Proxy Name Cache 54. A positive response type ("POS.") indicates that the node name was located by the Name Server 32 in its Network Name Directory, and the address field (column 3) and the node type field (column 4) contain useful information. A negative response type ("NEG.") indicates that the Name Server 32 was unable to locate the node name, and therefore the address and node type fields for the entry do not contain useful information. As illustrated in FIG. 3, a negative response designation is generally associated with b-node names on the same LAN as the proxy (e.g., LAN_A for proxy 14).

The node type field describes the type of naming protocol supported by the node. In the illustrative embodiment, the node types comprise b-node, p-node, m-node and h-node types. However, other naming protocols will be used in other embodiments of the invention.

The Time Left field in the proxy name cache 54 provides a reasonable degree of assurance that the information contained in the proxy name is valid information. The Time Left field 54 indicates how much time remains before the entry will be purged by the proxy 14 from its proxy name cache 54. In the illustrative embodiment of the invention, the maximum time loaded into a proxy name cache entry is re-configurable by an administrator of the proxy 14. A particular example is a maximum time of ten (10) minutes. This represents a balance between the proxy 14 having to transmit a new p-node query to the Name Server 32 and the need to purge stale address information from the proxy name cache in view of the dynamic nature of connections to the network. It is desirable to make this value easily re-programmable in order to adjust for varying cost of p-node queries to the Name Server and varying network traffic.

Thus, the Proxy Name Cache 54 reduces the network communication workload of the proxy 14 by saving the results of previous p-node queries to the Name Server 32. The proxy 14 does not transmit a p-node query to the Name Server 32 in response to a received b-node protocol registration or query if the node name included in the b-node protocol registration or query is listed in the Proxy Name Cache 54. However, in order to ensure that the cache information is not stale, a time left field is included to enable the Proxy 14 to purge old entries from the Proxy Name Cache 54.

Continuing with the description of FIG. 3, it is first noted that the Proxy 14 maintains an address for the local sub-net upon which it is located. In the present example, the sub-net address is "1.1.1.X" where the "X" indicates any extension of an address for a node on the sub-net. The proxy 14 uses the local sub-net address to determine whether an address corresponds to a local node on the sub-net. This is used by the proxy 14 to withhold transmitting a response when the proxy 14 knows (because of the local sub-net address) that an address for a name in the Proxy Name Cache 54 corresponds to a b-node, m-node, or an h-node on the local sub-net—since these node types will respond to a b-node protocol query or registration and do not need the assistance of the proxy 14.

The list of node names in the local node cache includes BOB_PC which is associated with b-node 2 on LAN_A. The corresponding network address is listed as unknown since BOB_PC, a b-node, is not registered in the Network Name Directory of the Name Server 32. B-nodes 4, 6 and 8 on LAN_A, named SUE_PC, JANE_PC and JOHN_PC respectively, also have no corresponding address information associated with their entries in the Proxy Name Cache 54.

The h-node 20 on LAN_B, named PRINTER_2 has an address of "2.2.2.1". The proxy 14 is able to recognize that the name PRINTER_2 does not reside on LAN_A since PRINTER_2's sub-net address does not match the 1.1.1.X sub-net address for LAN_A. The b-node 28 LAN_B, names SALES_1 has an address of "2.2.2.3". Since the SALES_1 node is a b-node, it cannot dynamically register with the Name Server 32. Instead, a network administrator must directly enter the network address for SALES_1 in the Network Name Directory. Such a case could arise if SALES_1 is a server to which other nodes wish to communicate.

The proxy 14 and m-node 10 from FIG. 1, are named PROXY_1 and FILESERVER_1 respectively. Both of these m-nodes have LAN_A addresses. Finally, the p-node 12, named PRINTER_1, has a network address of 1.1.1.6. The status of the time left field for PRINTER_1 indicates that it will be purged from the Proxy Name Cache 54 in four (4) minutes.

Having described relevant fields maintained by the proxy 10 in an illustrative embodiment of the present invention, attention is now directed to FIG. 4 which schematically depicts the Network Name Directory maintained by the Name Server 32. When a node registers with the Name Server 32, the Name Server 32 first determines whether any other node is currently registered in the Network Name Directory under the same name. If the node name is not already listed in the Network Name Directory, then the Name Server 32 adds the name, network address and node type associated with the node to the Network Name Directory.

The Network Name Directory maintains a Time to Live field for each entry in order to ensure that stale connection information does not reside in the Network Name Directory in the event that node addresses change without explicit notification to the Name Server 32. The Time to Live field is similar in function to the time left field in the Proxy Name Cache 54. When the time left reaches zero for an entry in the Network Name Directory, the entry is purged by the Name Server 32. In the illustrative example, dynamically registering nodes (p-nodes, m-nodes, and h-nodes) have times to live on the order of days. However, B-nodes, which must be directly entered in the Network Name Directory—typically by a network administrator—, have a limitless time to live. An example of such an entry is the b-node 28 named SALES_1. The SALES_1 entry is a static entry and is removed only by a network administrator entering a delete command to delete the entry from the Network Name Directory.

Figure 5:
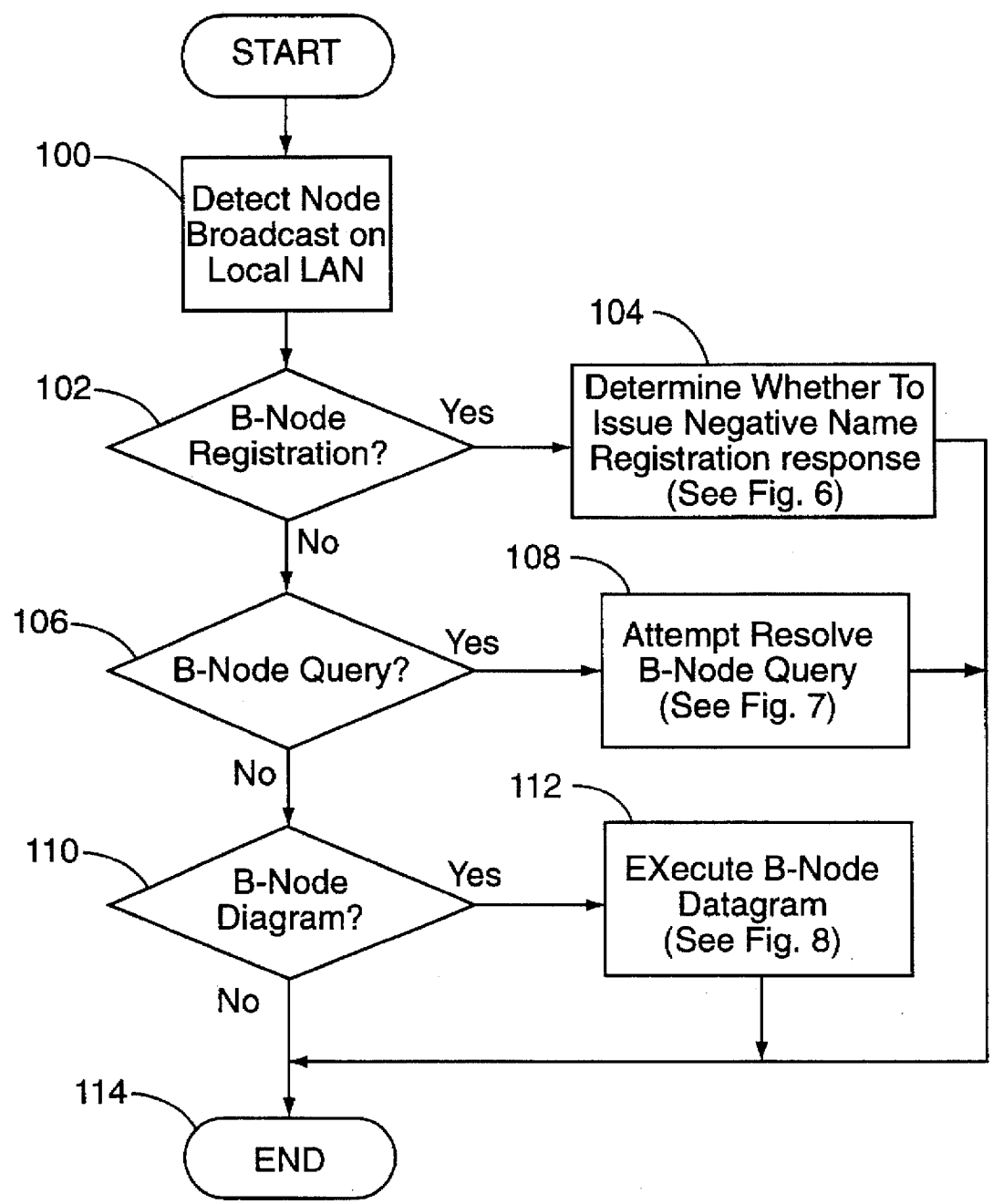
FIG. 5 is a flow chart depicting the general steps performed by the naming proxy agent in accordance with the illustrative embodiment of the present invention.

Before describing the steps summarized in FIG. 5, a brief background discussion of the basic procedures of a naming service is provided. Naming services generally comprise three components: registering a node name, releasing a node name, and querying a network in order to obtain a network address corresponding to a node name. Registering a node involves notifying other nodes of the network that a particular node intends to claim a particular name which cannot be used by any other node in the relevant group of nodes. Registration of a name can occur by broadcasting the name to all of the nodes in a defined area (e.g. b-node). Alternatively registration of a node name may occur by registering a name in a directory maintained by a Name Server (e.g., p-node). During registration, a node may be denied from using a name that has already been claimed by another node. Releasing a node involves relinquishing a claim to a particular name which has been registered by a node. Finally, querying involves the issuance by a first node of a name of a second node with which the first node wishes to establish a connection. A query is properly responded to by returning an address to the first node corresponding to the name of the second node.

FIG. 5 summarizes the general operations executed by a naming proxy agent, for example proxy 14 on LAN__A, in order to maintain the above described proxy name cache, and to respond to b-node protocol registration and query broadcasts from nodes on the local LAN (LAN__A for proxy 14). At step 100, the proxy 14 detects a b-node protocol broadcast on LAN__A, the local LAN for the proxy 14, and control passes to step 102. At step 102, if the naming proxy agent determines that the b-node protocol broadcast is a b-node protocol registration broadcast, then a local node is attempting to register its name and corresponding address on LAN__A and control passes to step 104.

Next, at step 104, the proxy 14 determines whether or not to transmit a negative name registration response to the local node attempting to register is name on the LAN__A. The substeps executed by the proxy 14 during step 104 are specified in greater detail in FIG. 6 described below. Control then passes to End step 114.

If, at step 102, a b-node protocol registration was not broadcast on LAN__A, then control passes to step 106. At step 106, if the proxy 14 determines that a local node on LAN__A has issued a b-node protocol query for a named node, then control passes to step 108, and the proxy 14 attempts to resolve the b-node protocol query and, if possible and appropriate, return an address corresponding to the named node. The steps performed by the proxy 14 during step 108 to resolve the b-node query are summarized in FIG. 7 and described below. Control then passes to the End step 114.

If, at step 106, a b-node protocol query was not broadcast on LAN__A, then control passes to step 110. At step 110, if the proxy 14 determines that a node on LAN__A has broadcast a b-node datagram, then control passes to step 112. At step 112, the proxy 14 processes the received b-node datagram according to the steps summarized in FIG. 8 which is described below. Control then passes to the End step 114.

Figure 6:
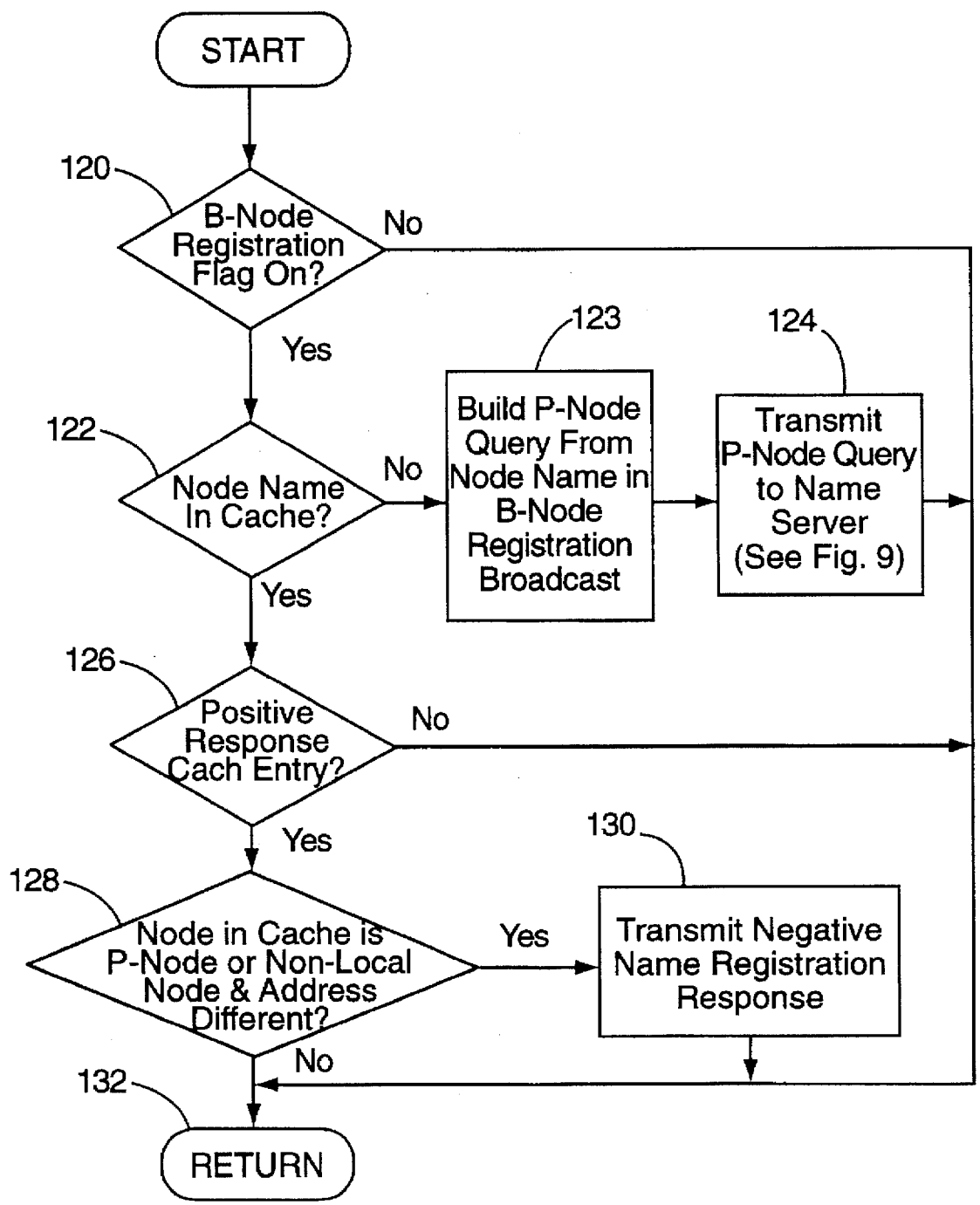
FIG. 6 is a flow chart depicting the steps performed by the naming proxy agent in response to receiving a b-node registration broadcast on the local LAN.

Turning now to FIG. 6, the steps are summarized for the proxy 14 responding to the receipt of a b-node protocol registration broadcast on the local LAN__A. A b-node Registration Flag in the proxy 14 indicates whether or not the proxy 14 will issue negative name registration responses on behalf of non-local nodes and local nodes that are incapable of responding to a b-node protocol registration (e.g., p-nodes). If at step 120, the proxy 14 determines that its b-node Registration Flag is not set, then control passes to Return step 132. It is noted that since the proxy 14 is an m-node, and therefore capable of responding to the b-node protocol registrations, the proxy 14 will always transmit a negative name registration response if a local node attempts to register using the name of the proxy 14.

If, at step 120, the b-node Registration Flag is set, then control passes to step 122. At step 122, if the proxy 14 determines that the node name in the b-node protocol registration broadcast is not the same as a name already listed in the Proxy Name Cache 54, then control passes to step 123. At step 123, the Controller/Converter 52 of the Proxy 14 extracts the node name from the b-node protocol registration broadcast and builds a p-node query having the node name. Control then passes to step 124.

At step 124, the proxy 14, via the p-node transmit interface 56 and p-node response interface 58, executes a p-node query operation with the Name Server 32. The steps performed by the proxy 14 during step 124 in order to execute the p-node query operation are summarized in FIG. 9 which is described below. Control then passes to the Return step 132.

At step 122, if the node name in the b-node protocol registration broadcast is the same as a name already listed in the Proxy Name Cache 54, then control passes to step 126. Before, describing step 126, it is again noted that the proxy 14 maintains entries corresponding to both successes and failures in previous p-node queries to the Name Server 32 in order to avoid submitting repeat queries to the Name Server 32 in a short time span. Therefore, before transmitting a negative name registration response, the proxy 14 determines whether the name in its Proxy Name Cache is a positive response entry.

At step 126, if the matching node name from the Proxy Name Cache 54 is not a positive response entry, then the proxy 14 has recently queried the Name Server 32 and received a negative name response from the Name Server 32. Therefore, the proxy 14 will not issue a negative name registration response and control passes directly to the Return step 132.

At step 126, if the matching node name in the Proxy Name Cache 54 is a positive response entry, then control passes to step 128. With respect to step 128, if the matching positive response entry in the Proxy Name Cache 54 corresponds to a local node (on LAN__A) that is capable of providing a response to a b-node protocol registration on the LAN__A, then the proxy 14 will not intervene, and control will pass to the Return step 132. Examples of such nodes are local b-nodes, m-nodes and h-nodes. Also, if the matching positive response entry has the same address as the b-node registration response (i.e., its the same node), then the proxy will not issue a negative name registration response, and control will pass to the Return step 132.

However at step 128, if the proxy 14 determines that the matching positive response entry does not have the same address, and the node corresponding to the matching entry is not capable of responding on its own to a b-node protocol registration broadcast on the LAN__A, then control passes to step 130. Examples of such nodes are p-nodes and non-local nodes. At step 130, the proxy 14 transmits a negative name registration response to the node attempting to register on LAN__A under the b-node protocol on behalf of the node represented by the positive response entry in the Proxy Name Cache 54. Control then passes to the Return step 132.

Figure 7:
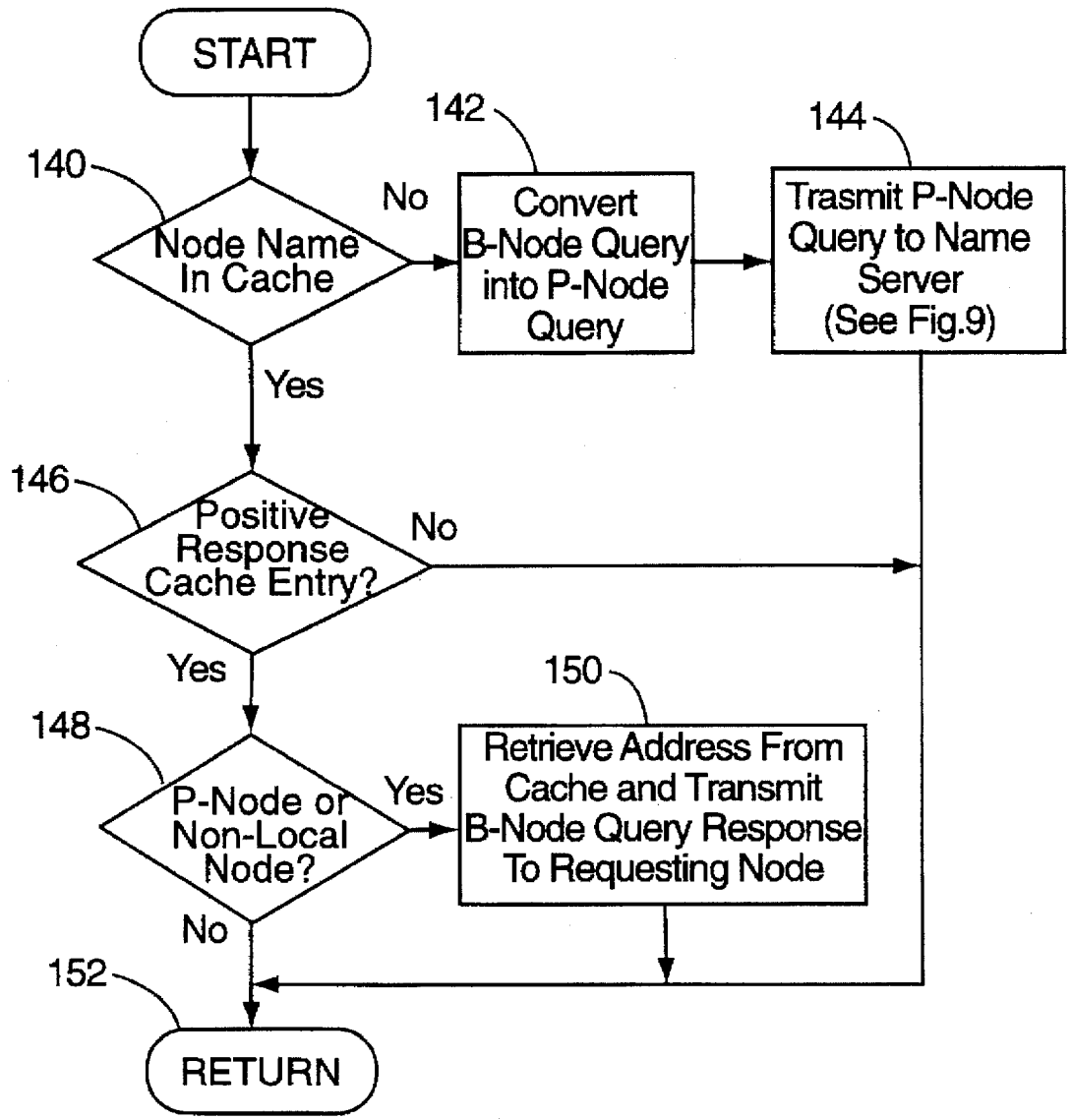
FIG. 7 is a flow chart depicting the steps performed by the network naming proxy agent in order to obtain and transmit addresses in response to receiving a b-node query on the local LAN.

Turning now to FIG. 7, the steps performed by the proxy 14 are summarized for responding to a b-node protocol query on the LAN__A. At step 140, if the proxy 14 determines that the node name in the b-node protocol query is not the same as a name already listed in the Proxy Name Cache 54, then control passes to step 142. At step 142, the Controller/Converter 52 of the Proxy 14 extracts the node name from the b-node protocol query and builds a p-node query having the node name. Control then passes to step 144 wherein the proxy 14, via the p-node transmit interface 56 and p-node response interface 58, executes a p-node query operation with the Name Server 32. The steps performed by the proxy 14 during step 144 in order to execute the p-node query operation are summarized in FIG. 9 which is described below. Control then passes to the Return step 152.

At step 140, if the node name in the b-node protocol query is the same as a name already listed in the Proxy Name Cache 54, then control passes to step 146. Before, describing step 146, it is once again noted that the proxy 14 maintains entries corresponding to both successes and failures in previous p-node queries to the Name Server 32 in order to avoid submitting repeat queries to the Name Server 32 in a short time span. Therefore, some name entries in the Proxy Name Cache 54, namely the negative response entries, will not have corresponding addresses.

At step 146, if the matching node name from the Proxy Name Cache 54 is not a positive response entry, then the proxy 14 has recently queried the Name Server 32 and received a negative name response from the Name Server 32. Therefore, the proxy 14 will not transmit a b-node protocol query response to the node that originated the b-node query on the LAN_A. Control passes directly to the Return step 152.

At step 146, if the matching node name in the Proxy Name Cache 54 is a positive response entry, then control passes to step 148. With respect to step 148, if the matching positive response entry in the Proxy Name Cache 54 corresponds to a local node (on LAN_A) that is capable of providing a response to a b-node protocol query from a node on the LAN_A, then the proxy 14 will not intervene, and control will pass to the Return step 152. Examples of such nodes are local b-nodes, m-nodes and h-nodes. However at step 148, if the proxy 14 determines that the matching positive cache response entry corresponds to a node that is not capable of responding on its own to a b-node protocol query on the LAN_A, then control passes to step 150. Examples of such nodes are p-nodes and non-local nodes. At step 150, the proxy 14 retrieves an address from the entry in the Proxy Name Cache 54 that matches the b-node query. The proxy 14, on behalf of the node unable to respond, transmits a b-node query response including the address to the requesting local node that originated the b-node protocol query. Control then passes to the Return step 152.

Figure 8:
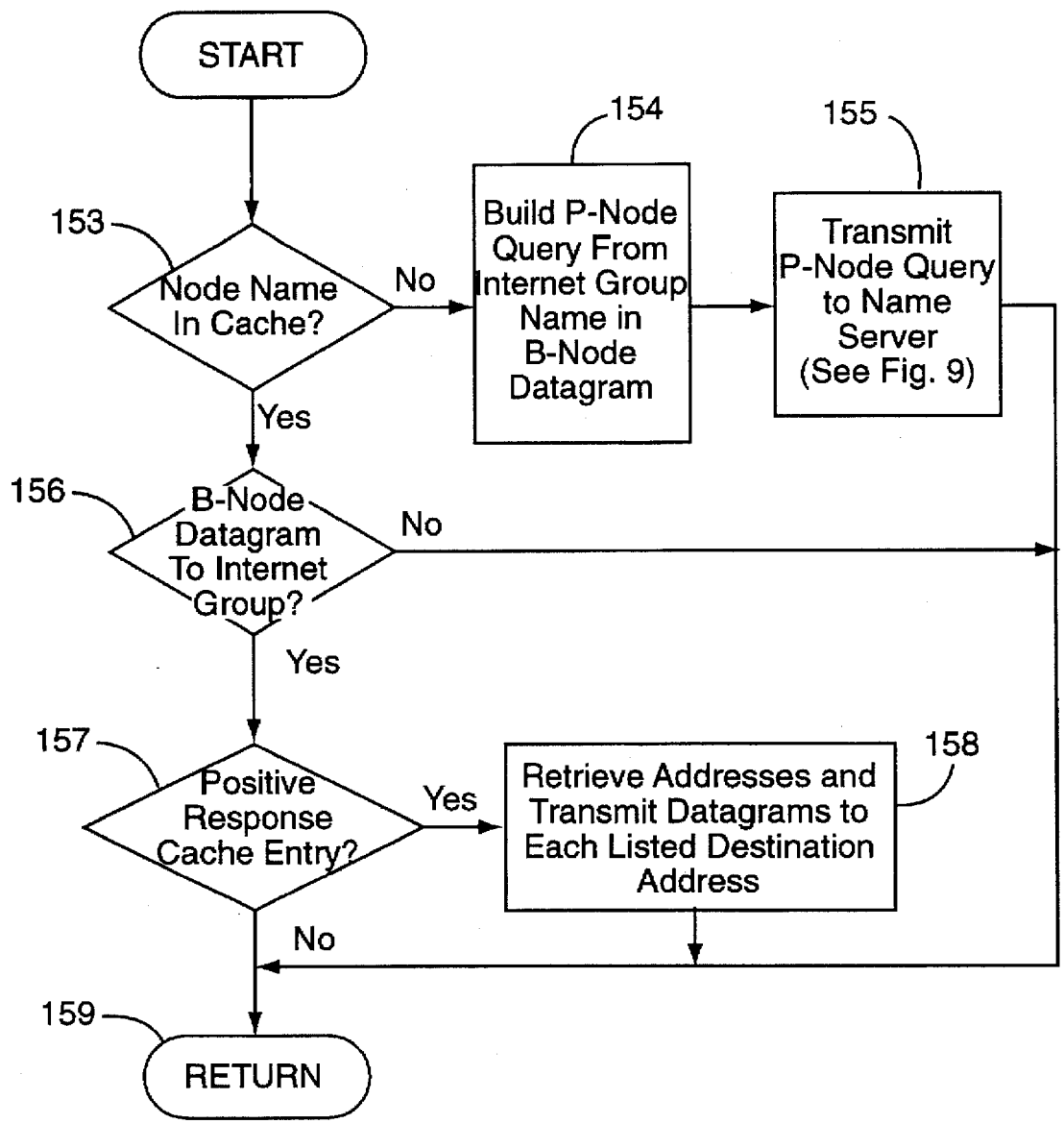
FIG. 8 is a flow chart depicting the steps performed by the network naming proxy agent in order to perform datagram distribution to a group of network nodes associated with a specified Internet Group name in response to receiving a b-node datagram naming the Internet Group.

Turning now to FIG. 8, the steps are summarized for the proxy 14 responding to the receipt of a b-node protocol datagram broadcast by a node on local LAN_A. In general, these steps make use of the Proxy Name Cache 54 and the proxy functions responsible for issuing queries to the Name Server 32 to enable a b-node to send a datagram to a named Internet Group.

At step 153, if the proxy 14 determines that the node name in the b-node protocol datagram is not the same as a name already listed in the Proxy Name Cache 54, then control passes to step 154. At step 154, the Controller/Converter 52 of the Proxy 14 extracts the node name from the b-node protocol datagram and builds a p-node query having the node name. Control then passes to step 155. At step 155, the proxy 14, via the p-node transmit interface 56 and p-node response interface 58, attempts to obtain the addresses associated with the Internet Group name in b-node protocol datagram. The proxy 14 therefore executes a p-node query operation with the Name Server 32. The response from the Name Server 32 will populate the cache with respect to the requested name, and the proxy 14 will be prepared to respond to the next occurrence of a b-node datagram send operation to the named Internet Group. The steps performed by the proxy 14 during step 155 in order to execute the p-node query operation are summarized in FIG. 9 which is described below. Control then passes to the Return step 159.

At step 153, if the node name in the b-node protocol datagram is the same as a name already listed in the Proxy Name Cache 54, then control passes to step 156. It is noted that positive response entries in the Proxy Name Cache 54 include a field designating the name type of the positive entry. This enables the designation of individual names, group names (a single broadcast address), and Internet Group names (multiple addresses for a single name). The proxy 14 only executes the datagram operation described below on Internet Groups. Therefore, at step 156, if the b-node datagram does not have a name type corresponding to an Internet Group entry in the Proxy Name Cache, then control passes to the Return step 159. However, if the b-node datagram contains the name type of an Internet Group, then control passes to step 157.

As noted above, the proxy 14 maintains entries corresponding to both successes and failures of previous p-node queries to the Name Server 32 in order to avoid submitting repeat queries to the Name Server 32 in a short time span. Therefore, before the proxy 14 commences extracting addresses for the member nodes in the named Internet Group, the proxy 14 determines whether the name in its Proxy Name Cache 54 is associated with a positive response entry. If the name is not associated with a positive response entry, then the named Internet Group is unknown to the proxy 14 and control passes to the Return step 159.

At step 157, if the name is associated with a positive response entry (for an Internet Group), then control passes to step 158. At step 158, the Internet Group name entry in the Proxy Name Cache 54 will have one or more destination addresses associated with it. The proxy 14, via the datagram transmitter 64, will send the datagram to each destination address. Control then passes to the Return step 159.

Figure 9:
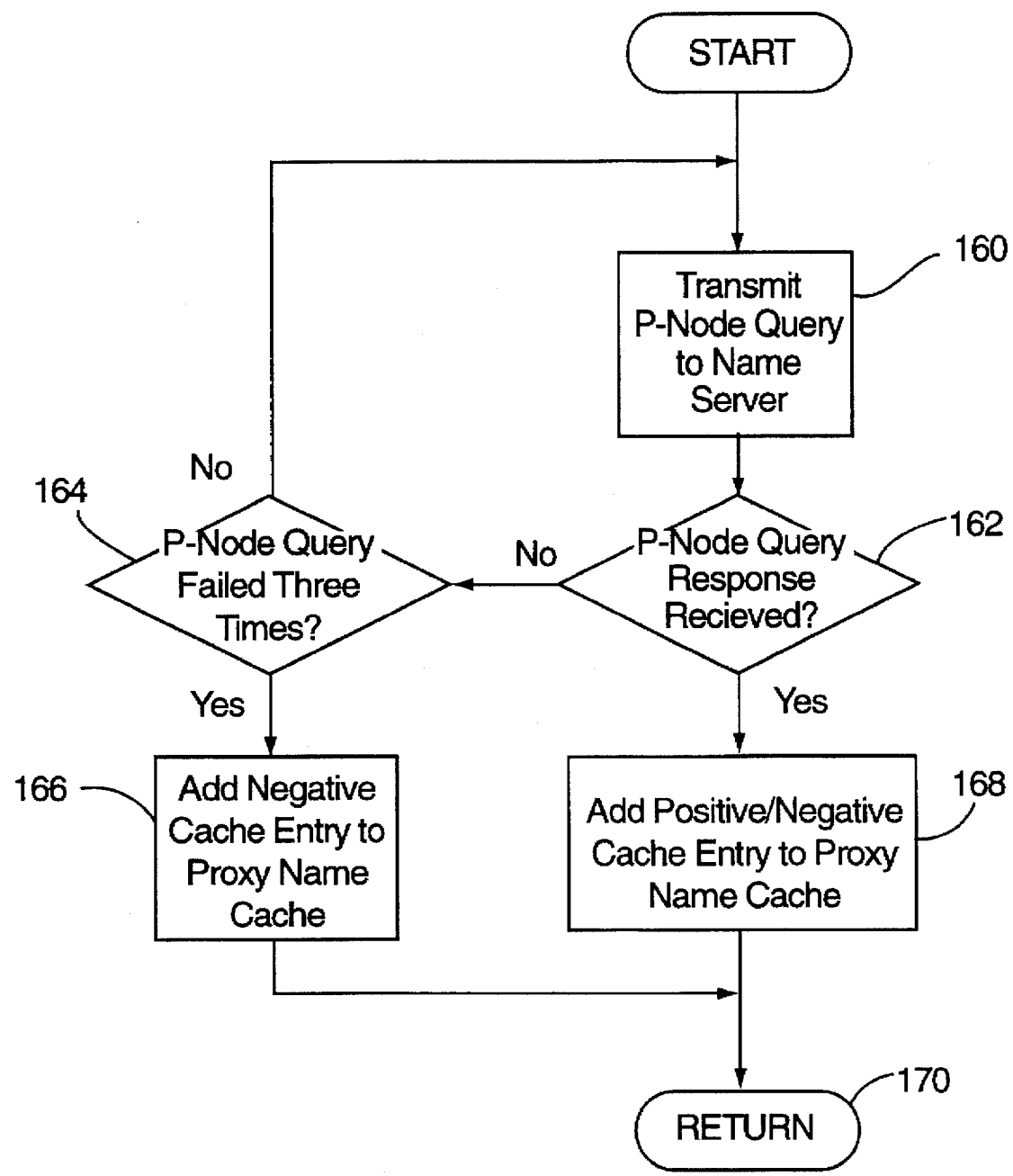
FIG. 9 is a flow chart depicting the steps performed by the naming proxy agent in order to query the name server for an address according to the p-node naming protocol.

Turning now to FIG. 9, the steps performed by the naming proxy agent 14 in order to query the Name Server for an address according to the p-node naming protocol are summarized. The steps illustrated in FIG. 9 are only executed when the Proxy Name Cache 54 does not have a node name entry matching a node name included in a b-node protocol registration or query broadcast on the LAN_A. At step 160 the proxy 14 transmits a p-node query containing a node name previously extracted from the b-node protocol broadcast.

It is possible that a transmitted p-node request will not be received by the proxy 14 within a programmed delay time. However, rather than fail immediately, the proxy 14 retransmits the p-node query to the Name Server. Therefore, at step 162, if the proxy 14 has not received a response from the Name Server 32 after a programmed wait period, then control passes to step 164.

While the proxy 14 is designed to account for some lost transmissions between the proxy 14 and the Name Server 32, the proxy 14 will only attempt to obtain a response to a p-node request three times. Therefore, at step 164, if the proxy 14 has failed less than three times to obtain a response from the Name Server 32, then control returns to step 160.

On the other hand, after three failures the proxy 14 will record the p-node query as a failure. Thus, at step 164, if a third failure has been registered, then control passes to step 164. At step 164 the proxy 14 adds a negative response entry in the Proxy Name Cache 54 that includes the name of the node for which the three failures occurred and control passes to Return step 170.

If the proxy 14 receives a p-node protocol query response from the Name Server 32 before the expiration of the wait period after a third p-node query transmission, then the proxy 14 stores the response in the Proxy Name Cache. Therefore, at step 162, if a p-node query response was received by the proxy 14, then control passes to step 168. At step 168, the proxy 14 adds the information associated with the p-node query response, including a negative/positive designation in the response type field indicating whether the name was found in the Network Name Directory of the Name Server 32. If the name was not found in the Network Name Directory, then a negative cache entry is stored for the node name for which a p-node protocol response was received by the proxy 14. If a name was found, then a positive cache entry is recorded in the Proxy Name Cache 54. Control then passes to the Return step 170.

Figure 10:
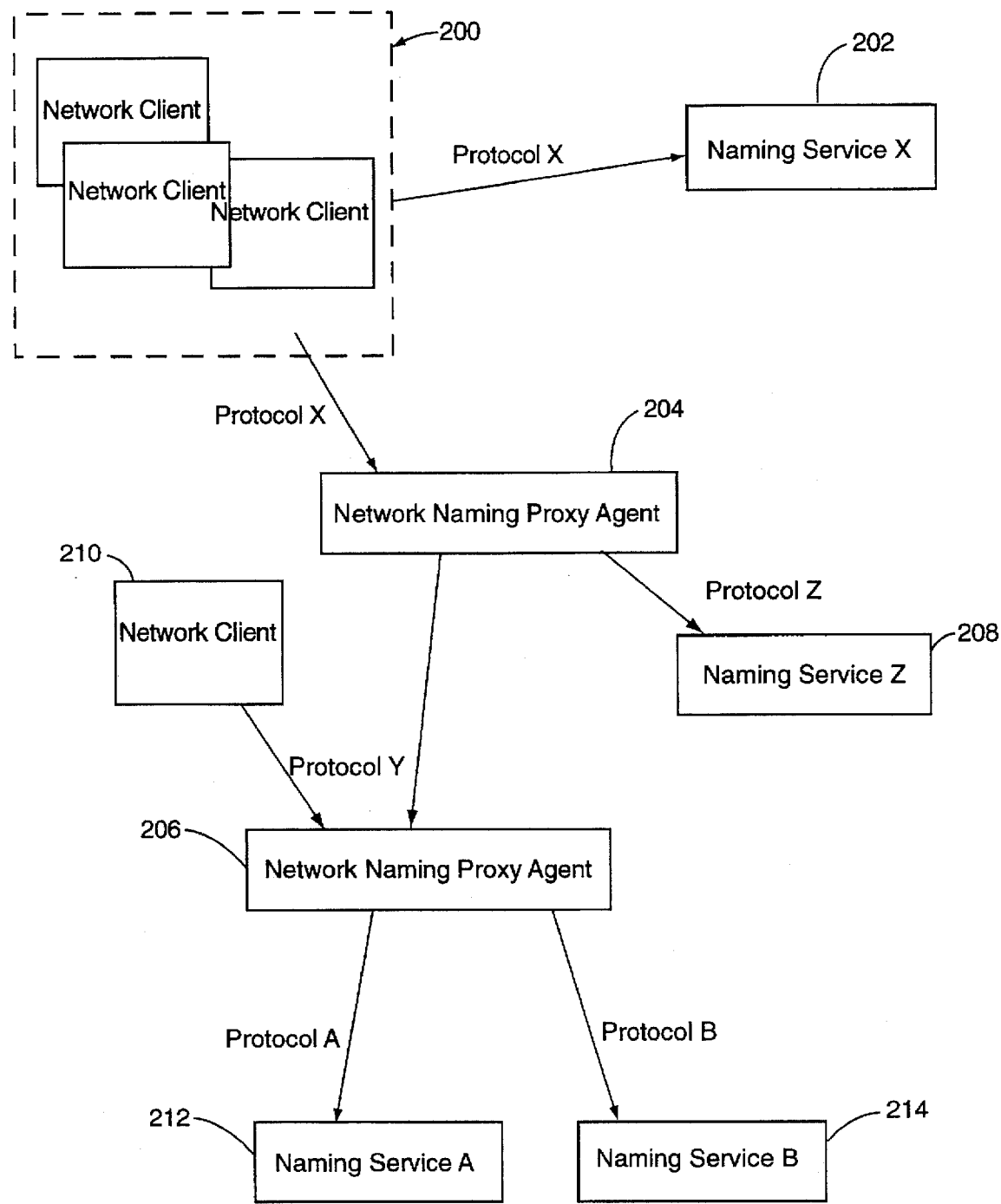
FIG. 10 is a functional schematic depiction of an alternative illustrative computer network embodying the present invention wherein at least one naming proxy agent converts naming queries under a first naming protocol to naming queries under second and third naming protocols.

Turning now to FIG. 10, a functional diagram depicts a more complex illustrative example of the present invention. In the example, a number of network nodes utilize different naming protocols to obtain addresses of other network nodes. A set of proxy agents are deployed in the network to bridge the differences between the network naming protocols employed by the network nodes and naming services. It is readily observed in the functional diagram that certain proxy agents are capable of providing bridges from a first protocol to more than one secondary naming protocol. It is further noted that the invention is not limited to a particular physical network arrangement and that the diagram represents the functional relationship between various network entities rather than the physical topology of the illustrated network entities.

The network functionally illustrated in FIG. 10 comprises a plurality of Clients 200 associated with a Naming Service X 202 that utilizes a naming protocol X for resolving network names. The network also includes a Proxy 204 which receives protocol X queries from the Clients 200 and converts the queries, if necessary, to protocol Y and protocol Z queries. The Proxy 204 converts protocol X queries to protocol Y queries and forwards the protocol Y queries to a Proxy 206. The Proxy 204 also converts protocol X queries to protocol Z queries and transmits the protocol Z queries to a Naming Service Z 208.

It is noted that the Proxy 204 only responds to protocol X queries. The Proxy 204 does not attempt to convert protocol Y or protocol Z queries into protocol X queries. In yet other embodiments of the present invention a proxy receives queries according to a plurality of naming protocols. In such a case, it will be necessary for the proxy to maintain a record of the naming protocol of the received query in order to ensure that a response will be provided by the proxy using the same naming protocol.

The network also comprises a client 210 which submits naming protocol Y queries to the Proxy 206. After receiving a protocol Y query from the Proxy 204 or the client 210, the Proxy 206 checks its proxy name cache. If a node name corresponding to the protocol Y query is not in the proxy name cache, then the Proxy 206 converts the received protocol Y query to protocol A and protocol B queries. The Proxy 206 forwards the respective converted queries to a Naming Service A 212 and a Naming Service B 214.

In cases where a proxy forwards queries to more than one naming service (e.g., Proxy 206 and the Naming Service A and the Naming Service B), the possibility exists that the proxy will receive two separate and distinct responses from the two independent naming services. There are a number of possible ways to deal with such results. The proxy 206 can apply rules or biases (favoring either the protocol A or protocol B query response). Sending a first query to either the protocol A or protocol B name server, and if the first query does not result in a positive response, then submitting a second query to the remaining name server. A simple solution to the multiple query response problem, that is satisfactory for a vast majority of the cases, is to merely use the first received response.

It is noted that the above discussion of FIG. 10 relating to network name queries applies to network name registration. The registration procedures would be executed in a manner analogous to the procedure described above with respect to FIG. 6. If either naming service returns a positive response, then the name will be recorded in the proxy name cache as a positive response entry. Of course the enablement of enforcement of network names (during node registration) in cases such as the proxy 206 may include selective enablement of the proxy 206 query functions to check a node name against only particular designated naming services (e.g., only Naming Service A).

As a prelude to the description of yet another embodiment of the present invention, the Internet employs the DNS naming service technology. DNS requires names to be manually entered by an administrator rather than the dynamic, automatic registration approach available under NBNS. The DNS naming protocol is described in detail in Mockapetris, P., RFC 1101: "Encoding of Network Names and Other Types", April 1989 (updating RFC 1034 and RFC 1035); Mockapetris, P., RFC 1035: "Domain Names—Implementation and Specification", November, 1987; and Mockapetris, P., RFC 1034: "Domain Names—Concepts and Facilities" November, 1987.

Therefore, when an organization wishes to provide the Internet with access to its file servers and provide naming services for obtaining the addresses using the DNS protocol, the addresses of the servers must traditionally be manually entered in a DNS name server. This is a time consuming and costly endeavor in instances where the number of such servers in the organization is large, or the organization is regularly modifying the server addresses. In the above described situation, the organization would be well served by a proxy which converts DNS queries to NBNS queries which are then forwarded to an NBNS server using the p-node naming service protocol.

In the illustrative example of the invention provided in FIG. 2, the proxy 14 bridged two differing network naming service technologies (b-node and p-node). In accordance with yet another illustrative example of the present invention, the proxy schematically depicted in FIG. 11, bridges two different naming service technologies that employ differing name spaces. In particular, the proxy translates DNS queries to NBNS queries and then forwards the NBNS queries to an NBNS Name Server in accordance with the p-node naming service protocol. Thus, the protocol conversion procedure includes the step of translating the received DNS name into a name compatible with the NBNS protocol according to a name translation rule (i.e. strip off the name suffix) before forwarding the query to an NBNS Name Server.

Figure 11:
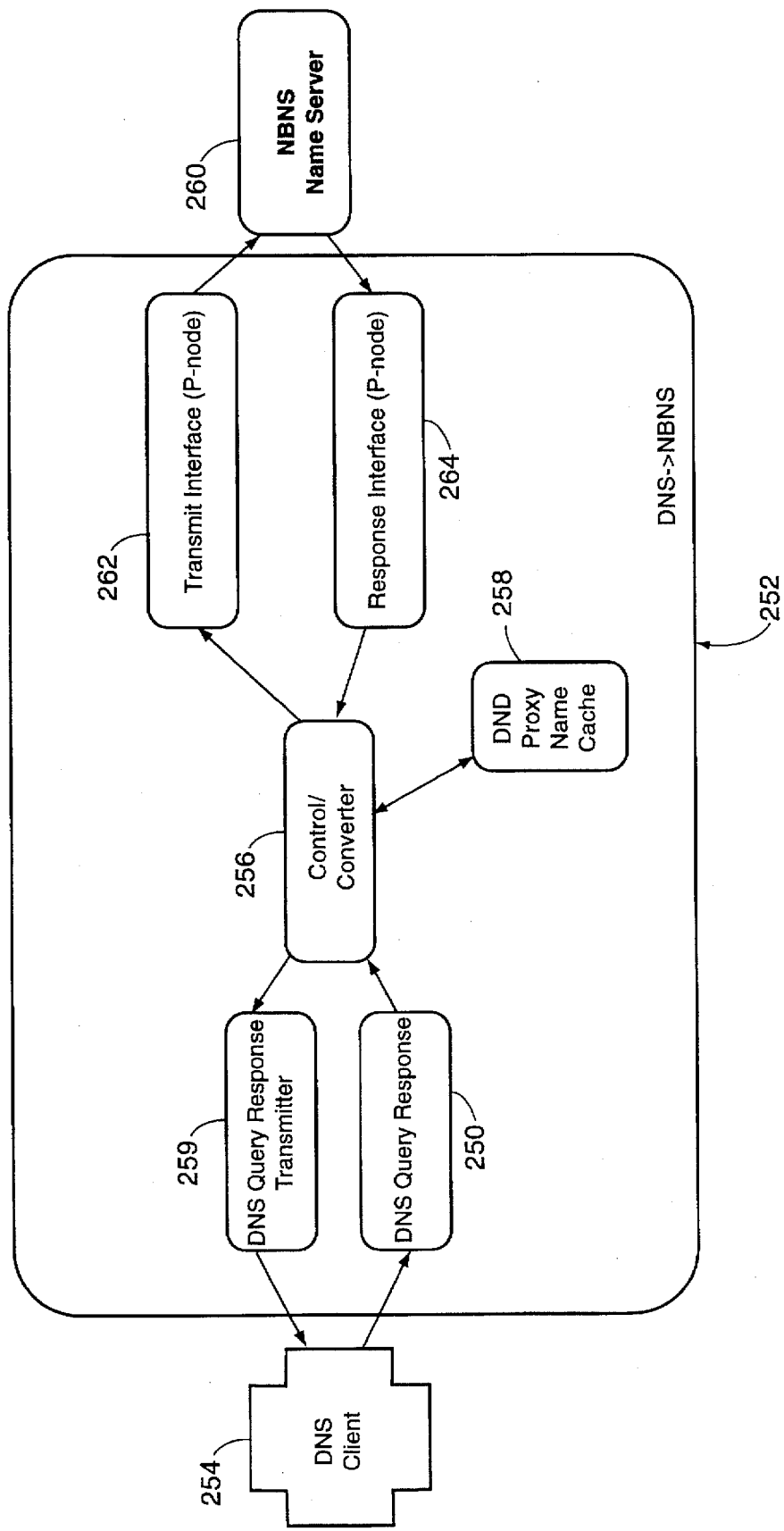
FIG. 11 is a schematic functional block diagram of the naming proxy agent in accordance with another illustrative example of the present invention wherein the proxy translates received Domain Name System (DNS) network naming queries into well known NetBios Name Service (NBNS) queries.

Turning now to FIG. 11, a DNS Query Receiver 250 of the DNS/NBNS proxy 252 receives a name query from a DNS client 254 under the DNS protocol. The DNS Query Receiver 250 forwards received name queries including a name, such as "jallard_386.microsoft.com" to a proxy cache request and response Controller/Converter 256. In this case, the suffix is ".microsoft.com".

The proxy 252 also includes a DNS Proxy Name Cache 258. The DNS Proxy Name Cache 258, maintains a list of names (in the DNS form) comprising DNS names for which an NBNS Name Server 260 has provided positive responses. In the illustrative example of the present invention the names are stored in the DNS Proxy Name Cache 258 in their DNS form (i.e., without the DNS suffix removed). If the name in a received query is presently listed in the DNS Proxy Name Cache 258, then the Proxy 252 issues a response via a DNS Query Response Transmitter.

Before transmitting a query to the NBNS Name Server 260 via a p-node Transmit Interface 262, the Controller/Converter 256 converts the DNS query into an NBNS query. The conversion procedure includes (1) translating the DNS name to the NBNS format, in particular stripping the DNS suffix from the name and capitalizing the remaining characters, and (2) incorporating the translated DNS name into a p-node protocol query.

After the NBNS Name Server 260 has processed the p-query from the proxy 252, the NBNS Name Server 260 transmits a response to a p-node Response Interface 264. The Response Interface 264 forwards the response to the Controller/Converter 256. The Controller/Converter 256 converts the response from the NBNS Name Server 260 into a DNS response. This process includes re-attaching the suffix to the name provided by the NBNS Name Server 260. The DNS Query Response Transmitter 259 transmits the DNS response to the DNS client 254.

Figure 12:
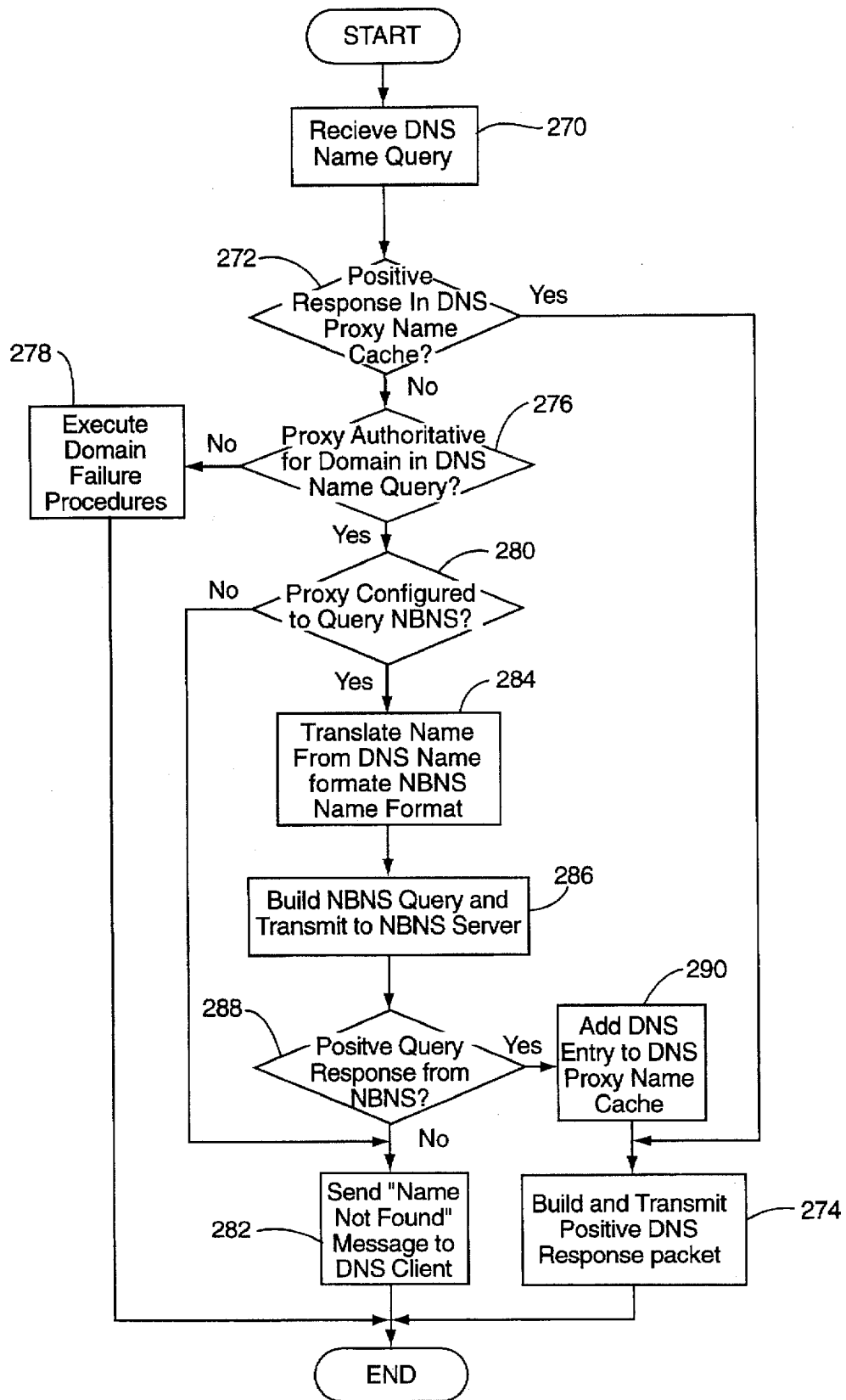
FIG. 12 is a flow chart depicting the general steps performed by the naming proxy agent in accordance with the alternative example of the present invention depicted in FIG. 11.

Having described the structure of the proxy 252, attention is now directed to FIG. 12 which summarizes the steps executed by the proxy 252 in response to receiving a DNS name query from the DNS client 254. At step 270, the DNS Query Receiver 250 receives a DNS name query including a DNS name, and forwards the DNS name query to the Controller/Converter 256. Next, at step 272, if the Controller/Converter 256 locates the DNS name in a list of names in the Proxy Name Cache 25, then the proxy 252 can resolve the DNS name query, and control passes to step 274.

At step 274, the Controller/Converter 256 builds a positive response packet containing the DNS name and its associated address. Thereafter, the positive response packet is transmitted to the DNS client 254 according to the DNS protocol. Control then passes to End step 292.

At step 272, if the DNS Proxy Name Cache 258 does not contain the DNS name, then control passes to step 276. At step 276, the Controller/Converter 256 compares the suffix of the DNS name to a list of configured domains for which the proxy 252 is authoritative. A proxy is authoritative is the domain in the DNS name matches a domain in the configuration file of the proxy 252. If the proxy 252 is not authoritative, then control passes to step 278. At step 278 the proxy 252 performs well known domain failure procedures including potentially forwarding the DNS name query to another DNS server. Control then passes to the End step 292.

However if the proxy 252 is authoritative over the domain with which the DNS name is associated, then control passes from step 276 to step 280. At step 280, if the proxy 252 is not configured to submit naming service queries from a DNS client to the NBNS Name Server 260, then control passes to step 282. The proxy 252 returns a DNS "Name Not Found" message corresponding to the DNS query to the client 254, and control passes to the End step 292.

At step 280, if the proxy 252 is configured to submit queries from a DNS client to the NBNS Name Server 260, then control passes to step 284 and the Controller/Converter 256 converts the DNS name from its DNS format into an NBNS format according to established translation rules. In the illustrative embodiment of a DNS to NBNS proxy, the translation includes removing the suffix of the DNS name and capitalizing all letters. After converting the DNS name into an NBNS name, control passes to step 286.

At step 286, the proxy 252 builds an NBNS query including the NBNS name, and transmits the NBNS query to the NBNS Name Server 260 using the NBNS protocol. When a response is received from the NBNS Name Server 260, control passes to step 288.

At step 288, if the Controller/Converter 256 determines that the response from the NBNS Name Server 260 is a negative response (i.e., the NBNS Name was not found by the NBNS Name Server 260), then control passes to step 282.

However, if the NBNS Name Server 260 returns a positive response packet to the NBNS query, then control passes to step 290. At step 290, the Controller/Converter 256 adds an entry to the DNS Proxy Name Cache 258 including the DNS name to which the positive response packet corresponds. Control then passes to step 274 described above.

Illustrative embodiments of a network topology and functional relationships between network entities incorporating the present invention have been described in the drawings and written description. It will be appreciated by those skilled in the art that naming proxy agents may be incorporated within a wide variety of network topologies. In addition, while the steps for performing the proxy functions have been described in the case of specific embodiments of the invention, the proxy functions may be executed in accordance with modifications to the disclosed steps without deviating from the spirit and scope of the invention. It is further noted that a proxy agent is not confined to dedicated network hardware and may reside on physical network hardware that performs other specified functions.

Illustrative examples of the present invention have been presented. However, as will be evident to those skilled in the art in view of the diverse examples provided, the scope of the present invention should not be restricted to the disclosed embodiments. Rather, the invention should be measured by the scope and spirit of the invention as defined by the claims appended below and include such modifications to the disclosed embodiment of the invention that would be known to those skilled in the art.

What is claimed is:

1. A network including a plurality of nodes which obtain addresses of other nodes in the network by transmitting names according to naming protocols and receiving addresses corresponding to the names, said network comprising:

a first node comprising means for facilitating obtaining network addresses corresponding to node names according to a first naming protocol;

a second node having a name and comprising means for facilitating obtaining network addresses corresponding to node names according to a second naming protocol that is incompatible with the first naming protocol;

a name server for responding to naming queries according to the second naming protocol; and a naming proxy agent comprising:
means for converting a first naming query including a name transmitted from the first node according to the first naming protocol into a second naming query that also includes the name;

means for transmitting the second naming query according to the second naming protocol to the name server;

means for receiving from the name server, according to the second naming protocol, an address corresponding to the second naming query; and means for passing, according to the first naming protocol, the address to the first node.

2. The network of claim 1 wherein the naming proxy agent further comprises a local node directory for maintaining a node list, and wherein an entry in the node list comprises a local node name and an address corresponding to the node name.

3. The network of claim 1 wherein the first naming protocol is a broadcast naming protocol.

4. The network of claim 3 wherein the second naming protocol is a point-to-point naming protocol.

5. A naming proxy agent for facilitating obtaining network addresses corresponding to node names in a network including a plurality of nodes which resolve node names into network addresses in accordance with at least first and second naming protocols which are incompatible, the network including a name resolver for responding to naming queries according to the second naming protocol, the naming proxy agent comprising:

means for converting a first naming query including a name transmitted from a first node according to a first naming protocol into a second naming query that also includes the name;

means for forwarding the second naming query to the name resolver according to the second naming protocol, means for receiving from the name resolver, according to the second naming protocol, an address corresponding to the second naming query; and means for passing, according to the first naming protocol, the address to the first node.

6. The naming proxy agent of claim 5 wherein the name resolver is located on a third node in the network physically distinct from a network node on which the naming proxy agent resides.

7. The naming proxy agent of claim 6 wherein the naming proxy agent and the first node reside on a same local area network.

8. The naming proxy agent of claim 5 wherein the naming proxy agent resides on a first sub-network and the name resolver resides on a second sub-network.

9. The naming proxy agent of claim 5 wherein the first naming protocol is a broadcast naming protocol.

10. The naming proxy agent of claim 9 wherein the second naming protocol is a point-to-point naming protocol.

11. The naming proxy agent of claim 5 wherein the name resolver is a naming service.

12. The naming proxy agent of claim 5 wherein the name resolver is a second naming proxy agent.

13. A method for resolving node names into network addresses in a network including a first node and a second node which resolve node names by means of respective first and second naming protocols which are incompatible, the network having a name resolver which responds to naming queries according to the second naming protocol, said method comprising the steps:

transmitting a first naming query including a name for the second node, by the first node, according to the first naming protocol;

receiving the first naming query, by a naming proxy agent, and in response converting the first naming query into a second naming query that also includes the name; and transmitting the second naming query, by the naming proxy agent, to the name resolver according to the second naming protocol;

receiving, by the naming proxy agent according to the second naming protocol, from the name resolver an address corresponding to the second naming query; and passing, by the naming proxy agent according to the first naming protocol, the address to the first node.

* * * * *